United States Patent
Blöchle et al.

(10) Patent No.: US 9,373,209 B2
(45) Date of Patent: Jun. 21, 2016

(54) COMMAND INPUT BASED ON DATA-CARRIER ORIENTATION

(71) Applicant: Inventio AG, Hergiswil (CH)

(72) Inventors: Hans Blöchle, Stans (CH); Kilian Schuster, Emmenbrücke (CH)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 14/653,971

(22) PCT Filed: Dec. 11, 2013

(86) PCT No.: PCT/EP2013/076199
§ 371 (c)(1),
(2) Date: Jun. 19, 2015

(87) PCT Pub. No.: WO2014/095513
PCT Pub. Date: Jun. 26, 2014

(65) Prior Publication Data
US 2015/0356799 A1 Dec. 10, 2015

(30) Foreign Application Priority Data
Dec. 21, 2012 (EP) .................... 12199272

(51) Int. Cl.
*G06K 5/00* (2006.01)
*G07C 9/00* (2006.01)
*G06K 7/14* (2006.01)
*G06K 7/10* (2006.01)

(52) U.S. Cl.
CPC ........ *G07C 9/00182* (2013.01); *G06K 7/10366* (2013.01); *G06K 7/1456* (2013.01); *G07C 9/00007* (2013.01); *G07C 2009/00277* (2013.01); *G07C 2209/62* (2013.01); *G07C 2209/63* (2013.01)

(58) Field of Classification Search
CPC ........ G06K 5/00; G06K 19/00; G06K 19/06; G06K 7/08; G07B 15/02; G06F 17/00
USPC .......... 235/382, 380, 492, 488, 451, 487, 375
See application file for complete search history.

(56) References Cited

U.S. PATENT DOCUMENTS

| | | | |
|---|---|---|---|
| 4,979,594 A | 12/1990 | Begle et al. | |
| 5,923,022 A * | 7/1999 | Penn ................ | G06K 7/10861 235/454 |
| 6,145,748 A * | 11/2000 | Neifer ............... | G06K 7/0021 235/451 |
| 2003/0036425 A1* | 2/2003 | Kaminkow ........ | G06Q 20/3433 463/25 |
| 2003/0141590 A1* | 7/2003 | Kamiya ............. | G06K 19/072 257/730 |
| 2004/0089717 A1* | 5/2004 | Harari ............... | G06F 13/387 235/441 |
| 2006/0046842 A1* | 3/2006 | Mattice ............. | G06Q 20/3433 463/29 |
| 2007/0175972 A1* | 8/2007 | Ringer ............... | G07F 7/10 235/3 |
| 2008/0284600 A1* | 11/2008 | Drzaic .............. | A62B 99/00 340/572.1 |

(Continued)

FOREIGN PATENT DOCUMENTS

| DE | 102008005730 A1 | 7/2008 |
|---|---|---|
| WO | 9852136 A1 | 11/1998 |

*Primary Examiner* — Edwyn Labaze
(74) *Attorney, Agent, or Firm* — Fraser Clemens Matin & Miller LLC; William J. Clemens (57) ABSTRACT

A command can be input into a system using a data carrier such as, for example, a card. The command is determined based on the orientation of the data carrier relative to a reader of the system. Different commands can be input by changing the orientation of the data carrier.

16 Claims, 9 Drawing Sheets

(56) References Cited

U.S. PATENT DOCUMENTS

| | | |
|---|---|---|
| 2009/0278915 A1 | 11/2009 | Kramer |
| 2010/0052931 A1 | 3/2010 | Kolpasky et al. |
| 2011/0100762 A1 | 5/2011 | Gerstenkorn et al. |
| 2011/0115611 A1* | 5/2011 | Tsirline ............ G06L 1/18 340/10.2 |
| 2012/0019363 A1* | 1/2012 | Fein ............ G06K 19/072 340/10.1 |
| 2012/0085826 A1* | 4/2012 | Talker ............ G07F 7/0833 235/492 |
| 2014/0070008 A1* | 3/2014 | Kane ............ G09F 3/0297 235/488 |
| 2014/0224883 A1* | 8/2014 | Aiyer ............ G06K 19/07745 235/492 |

\* cited by examiner

COMMAND INPUT BASED ON DATA-CARRIER ORIENTATION

FIELD

This disclosure concerns the inputting of commands into an electronic or computer-based system.

BACKGROUND

Electronic and computer-based systems often receive commands from users. For example, an access control system may receive a command to open a door. As another example, an elevator control system may receive a command to send an elevator car to a particular floor. Such commands can be input using, for example, a button on a panel or another interface.

US20110100762A1 describes, among other things, an electronic door trim with command buttons.

Further options for the input of commands into systems could be advantageous. This is addressed herein by at least some of the embodiments described.

SUMMARY

A command can be input into a system using a data carrier such as, for example, a card. The command is determined based on the orientation of the data carrier relative to a reader of the system. Different commands can be input by changing the orientation of the data carrier.

In some embodiments, a command input method comprises: determining, using a reader, a first location of a first tag in a data carrier, the data carrier comprising first and second surfaces; determining, using the reader, a first location of a second tag in the data carrier; determining a first orientation of the data carrier relative to the reader based on the first location of the first tag and the first location of the second tag; selecting a first command based on the first orientation of the data carrier; determining, using the reader, a second location of the first tag relative to the reader; determining, using the reader, a second location of the second tag relative to the reader; determining a second orientation of the data carrier relative to the reader based on the second location of the first tag and the second location of the second tag; and selecting a second command based on the second orientation of the data carrier. The data carrier can include one or more markings associated with the first command or the second command. In some cases, the first surface of the data carrier faces the reader during the determining of the first and second locations of the first tag and the first and second locations of the second tag. The reader can comprise first and second reader units, the determining the first location of the first tag comprising reading the first tag using the first reader unit, and the determining the first location of the second tag comprising reading the second tag using the second reader unit. The method can further comprise sending the selected command to a building control system (e.g., an elevator control system, an access control system, a lighting system, a heating system, a cooling system, a ventilation system). In some cases, the data carrier does not touch the reader. In some cases, the data carrier is not inserted into the reader.

Some embodiments of a command input system comprise: a reader and a computer-based control device coupled to the reader, the control device being configured to perform a method, the method comprising: determining, using the reader, a first location of a first tag in a data carrier, the data carrier comprising first and second surfaces, determining, using the reader, a first location of a second tag in the data carrier, determining a first orientation of the data carrier relative to the reader based on the first location of the first tag and the first location of the second tag, selecting a first command based on the first orientation of the data carrier, determining, using the reader, a second location of the first tag relative to the reader, determining, using the reader, a second location of the second tag relative to the reader, determining a second orientation of the data carrier relative to the reader based on the second location of the first tag and the second location of the second tag, and selecting a second command based on the second orientation of the data carrier. The system can further comprise a lock to which the selected command is sent. The reader can comprise an antenna array. The reader can also comprise first and second reader units. The data carrier can also comprise third and fourth tags. The command input system can be mounted in a housing for a lock.

Further embodiments comprise a computer-based device configured to perform one or more of the disclosed methods.

Particular embodiments have a selected ratio of the size of reader units to the size of tags. For tags that receive and transmit radio signals, this ratio can be based on, for example, the area of the antenna used by the tags. Exemplary ratios of reader-unit size to tag size can include: 1:1; 1:1.5; 1:2; 1:3; 2:1; 1.5:1; or another ratio.

The data carrier may touch the reader, but can also be read from a short distance. Only partial coverage of the allocated reader region with the tag area is needed for reading the tag. However, a greater coverage of the allocated reader region accelerates the readout and increases reliability. In any case the system can be used freehand without slots to insert the card.

At least some embodiments allow for inputting different commands using a single data carrier, without using buttons. In further embodiments, a data carrier includes multiple tags that are readable by different reader systems. A data carrier can include markings to help a user recognize how to orient the data carrier, relative to a reader, for particular commands.

At least some embodiments of the disclosed methods can be implemented using a computer or computer-based device that performs one or more method acts, the computer or computer-based device having read instructions for performing the method acts from one or more computer-readable storage media. The computer-readable storage media can comprise, for example, one or more optical disks, volatile memory components (such as DRAM or SRAM) and/or non-volatile memory components (such as hard drives, Flash RAM or ROM). The computer-readable storage media do not cover pure transitory signals. The methods disclosed herein are not performed solely in the human mind.

DESCRIPTION OF THE DRAWINGS

The disclosure refers to the following figures, in which.

DETAILED DESCRIPTION

Figure 1:
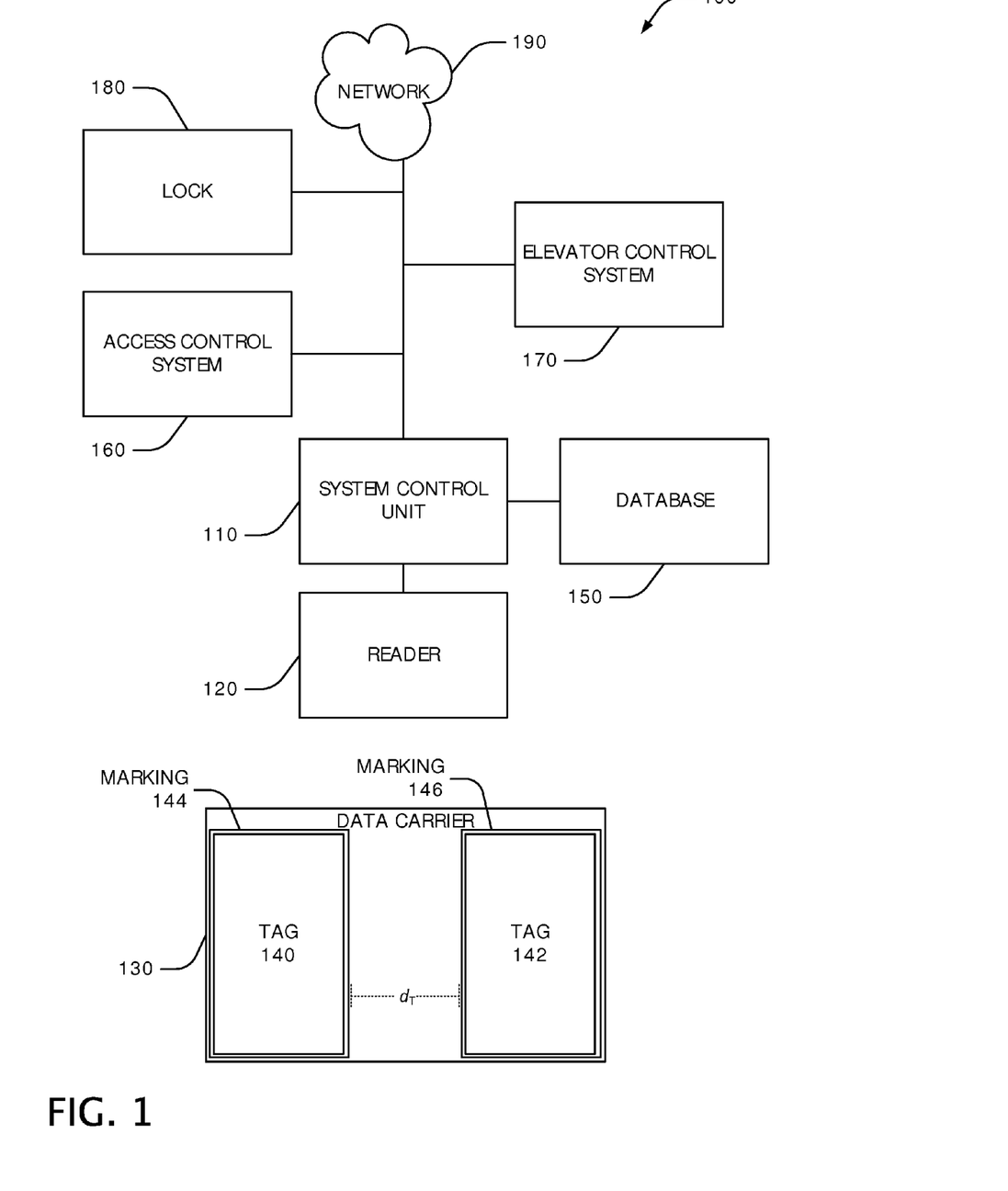
FIG. 1 shows a block diagram of an exemplary embodiment of a command input system.

FIG. 1 shows a block diagram of an exemplary embodiment of a command input system 100. The system 100 comprises a computer-based system control unit 110, which is programmed to perform one or more of the method acts described herein. The system control unit 110 is communicatively coupled to at least one reader 120. The reader 120 is configured to read information from a data carrier 130. In at least some embodiments, the data carrier 130 comprises two or more information-bearing tags 140, 142. In some cases, the tags 140, 142 comprise radio frequency identification (RFID) tags. In various embodiments, passive tags and/or active tags can be used. In further embodiments, the tags 140, 142 use near-field communication (NFC) technology. In additional embodiments, the tags 140, 142 comprise one- or two-dimensional optical codes (e.g., bar codes, QR codes, or another type of code). In some embodiments using two-dimensional optical codes, only one tag 140 is on the data carrier 130. The reader 120 reads information from the tags 140, 142 that allows the system 100 to distinguish the tags 140, 142 from each other.

Depending on the particular embodiment, the data carrier 130 can have various form factors. For example, the data carrier 130 can be shaped like a credit card, it can be shaped like a key fob, a tag, a sticker, or it can have another shape. Depending on the particular form factor, the data carrier 130 has various surfaces (e.g., a front surface and a back surface). In some embodiments, the data carrier 130 is at least partially labeled with one or more markings 144, 146 (e.g., with text, colors, and/or images) to aid a user in determining how to orient the data carrier 130 relative to the reader 120. Corresponding markings on the reader 120 (not shown) can also be used. In the particular version depicted in FIG. 1, the markings 144, 146 indicate the respective positions and sizes of the tags 140, 142. Although in many cases markings on the data carrier 130 and/or the reader 120 do not needed to be followed exactly when positioning the carrier 130 relative to the reader 120, precision positioning can produce improved results. In any of the disclosed embodiments, the data carrier 130 can have a rigid form or a semi-rigid form. In any of the disclosed embodiments, the tags 140, 142 can have fixed locations relative to each other in the data carrier 130.

The tags 140, 142 are separated from each other by a distance $d_T$. The separation represented by the distance $d_T$, can make it easier for a reader to determine the locations of the tags 140, 142. The actual value for $d_T$ varies from embodiment to embodiment, but $d_T$ can depend on one or more factors, such as: size of the tags 140, 142; size of the data carrier 130; and/or sensitivity or other characteristics of the reader 120. Exemplary values for the distance $d_T$ can include: less than 1 cm, 1 cm, 2 cm, 3 cm, 4 cm, 5 cm, or another distance. The tags 140, 142 are located on opposite ends of the data carrier 130, thus optimizing the distance $d_T$. In particular embodiments, the data carrier 130 has a width of approximately 8.5 cm and a height of approximately 5.4 cm, the distance $d_T$ between the tags 140, 142 being approximately 3.5 cm. The tags 140, 142 each comprise an antenna having dimensions of approximately 4 cm by 2.5 cm.

The system control unit 110 can also be communicatively coupled to one or more other components. For example, the control unit 110 can be coupled to a database 150, which stores information about, for example, users, user access times, and user access zones. The control unit 110 can also be coupled to an access control system 160 (e.g., a security system) for an area and/or a building. The control unit 110 can also be coupled to an elevator control system 170. The control unit 110 can also be coupled to a lock 180, which controls access to a building, a room, a floor, a storage space, a garage and/or another area. The control unit 110 can also be coupled to a network 190, which allows the control unit 110 to exchange information with one or more other electronic devices. The other electronic devices can be located remotely and/or locally relative to the control unit 110.

In various embodiments, the system 100 is located within a building. In further embodiments, the system 100 can also be located in and used within areas larger than a building and areas smaller than a building. For example, the system 100 could be used across a relatively large area, such as a campus, city, country or another large area. In such cases, at least some of the components are located remotely from each other. In other cases, the system 100 is used within a floor of a building, within a room of a building, or within two or more neighboring buildings. In some cases, the system 100 is integrated into a door, into a door trim or into an area near a door.

In various embodiments, one or more of the components of the system 100 comprise energy-saving features. For example, the components can enter a low-energy or "standby" mode during an actual or expected low-use period. This can reduce energy consumption and, in cases where the components rely at least partially on battery power, extend the life of the battery. In some cases, the lock 180, for example, can enter a standby mode after a period of disuse and then exit the standby mode in response to movement of a door handle or other component.

Figure 2:
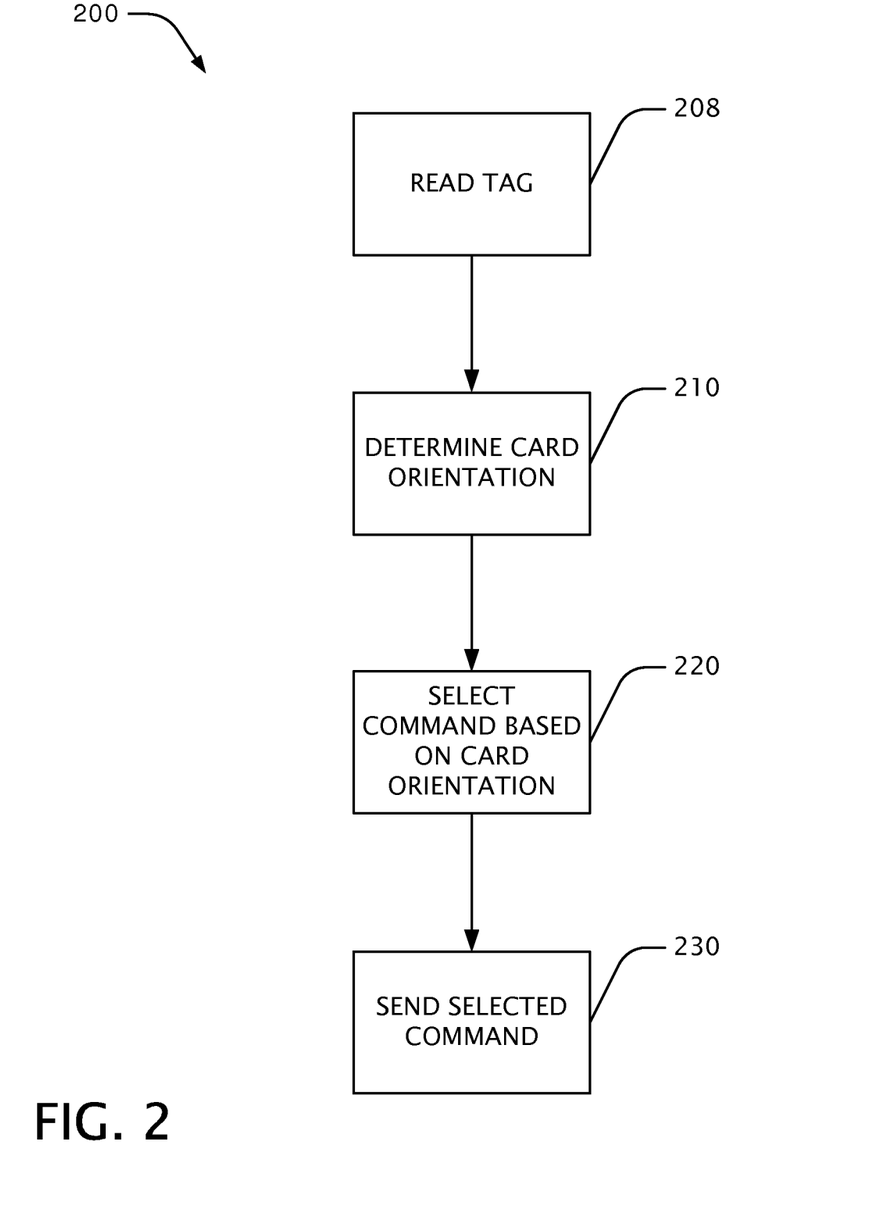
FIG. 2 shows a block diagram of an exemplary embodiment of a method for receiving a system command.

FIG. 2 shows a block diagram of an exemplary embodiment of a method 200 for receiving a system command. In a method act 208, a reader reads one or more tags on a card. The card can comprise, for example a data carrier such as the data carrier 130 of FIG. 1. (Although for convenience the term "card" is sometimes used in the specification and in the claims, other forms of data carriers can also be used in place of the card, unless explicitly stated otherwise.) In a method act 210, the orientation of the card relative to the reader is determined.

Figure 3A:
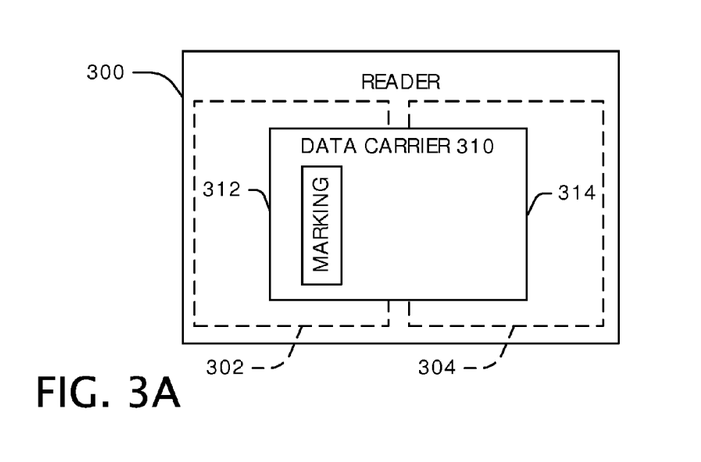
FIGS. 3A-3C show exemplary embodiments of a data carrier having an orientation relative to a reader.
Figure 3B:
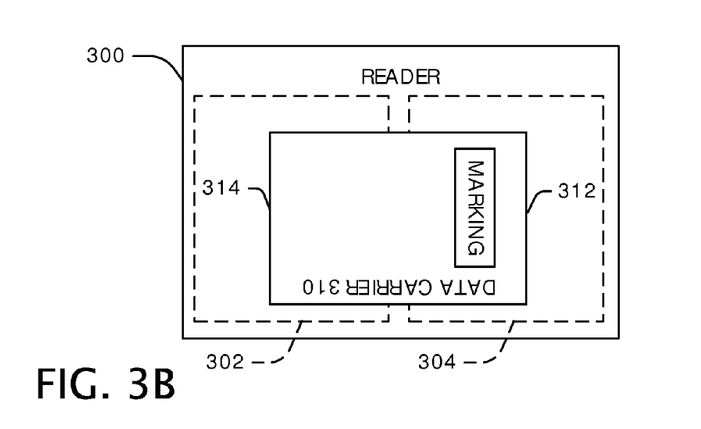
Figure 3C:
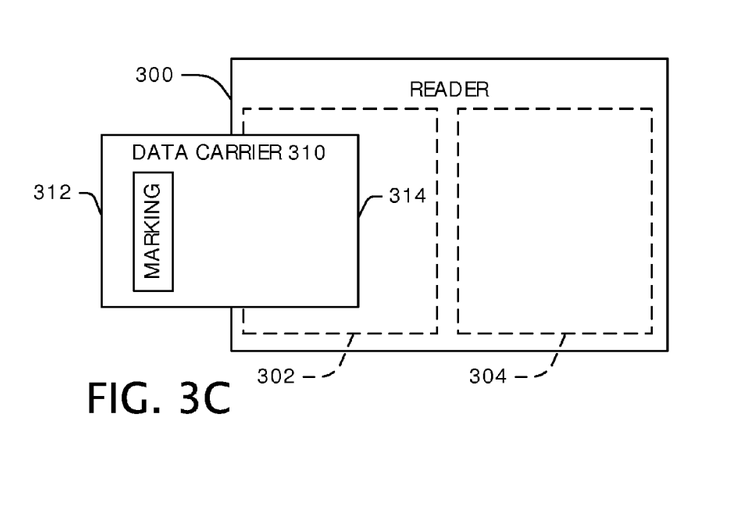

FIGS. 3A-3C show exemplary embodiments of a data carrier 310 having an orientation relative to a reader 300. In FIG. 3A, a first end 312 of the data carrier 310 is positioned over a first region 302 of the reader 300, and a second end 314 of the data carrier 310 is positioned over a second region 304 of the reader. In FIG. 3B, the data carrier 310 is rotated approximately 180 degrees relative to its position in FIG. 3A. That is, in FIG. 3B the second end 314 of the data carrier 310 is over the first region 302 of the reader 300, and the first end 312 of the data carrier 310 is over the second region 304 of the reader 300. In FIG. 3C, only a portion of the data carrier 310 is over the reader 300. Specifically, in the depicted example the second end 314 of the data carrier 310 is over the first region 302 of the reader 300, while the first end 312 of the data carrier 310 is not over the first or second regions 302, 304 of the reader 300. Alternatively, the data carrier 310 could be positioned such that the second end 314 is over the region 304, while the first end 312 of the data carrier 310 is not over the first or second regions 302, 304. Alternatively, the data carrier 310 could be positioned such that the first end 312, but not the second end 314, is over part of the reader 300 (e.g., over region 302 or 304). (Although in this example the card is described as being "over" the reader, the distance between the card and the reader can vary in different embodiments.)

The possible relative orientations of the data carrier and the reader can vary by embodiment. Different embodiments can determine different numbers of card positions (e.g., 2, 3, 4, 5, 10, 20 or another number of positions). The possible positions in an embodiment can vary, for example, along one, two or three axes of movement of the data carrier.

Although FIGS. 3A-3C depict the reader 300 as having two regions 302, 304 used for determining the orientation of the data carrier 310, in further embodiments another number of regions is used (e.g., one, three, four, five, six or another number of regions). Preferably the regions are labeled.

Returning to FIG. 2, in a method act 220, a system command is selected based on the determined card orientation. For example, if a first end of the card is placed over the left region of the reader and the second end of the card is placed over the right region of the reader, then a first command is selected. However, if the first end of the card is placed over the right region of the reader and the second end of the card over the left region of the reader, then a second command is selected.

In various embodiments, different numbers of commands can be determined (e.g., 2, 3, 4, 5, 10, 20 or another number of commands). Possible commands can include, for example: locking a door; unlocking a door; calling an elevator to a particular floor; sending an elevator to a floor to pick up a passenger; placing a destination call for an elevator; placing an elevator into a special operating mode (e.g., a cleaning or maintenance mode); placing an elevator call for a trip with a large or bulky item (e.g., a hospital bed, a luggage cart); controlling lighting; and controlling heating, cooling or ventilation. Information associating a given data carrier position with a given command can be stored in a database (e.g., the database 150) and may be changed in the database if needed.

In a method act 230, the selected command is sent to an appropriate component to be carried out (e.g., a "lock door" command is sent to a lock, a "send car to lobby" command is sent to an elevator system).

From the point of view of a user, a method can comprise holding a data carrier in front of a reader in a first position to input a first command into a system (e.g., a lock, an access control system, an elevator system). The user can also hold the data carrier in front of the reader in a second position to input a second command into the system.

Figure 4:
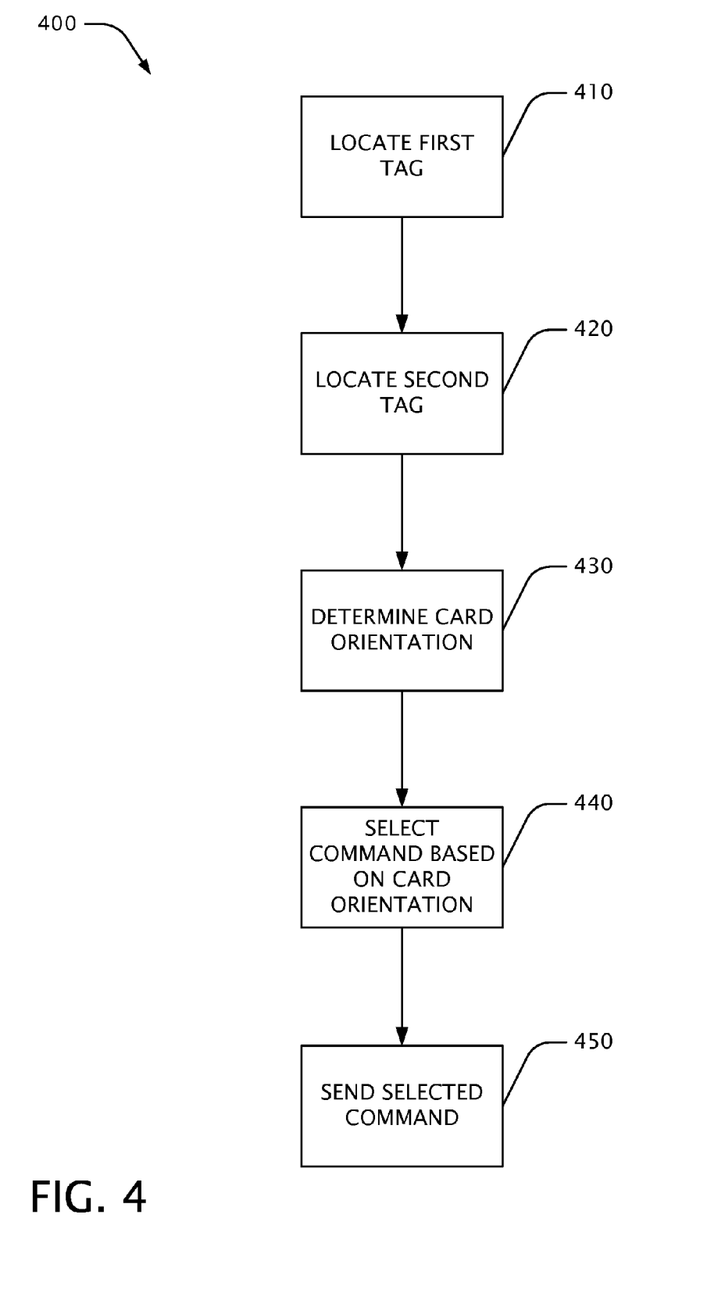
FIG. 4 shows a block diagram of another exemplary embodiment of a method for receiving a system command.

FIG. 4 shows a block diagram of another exemplary embodiment of a method 400 for receiving a system command. In a method act 410, a location of a first tag of a data carrier, relative to a reader, is determined. In a method act 420, a location of a second tag of the data carrier, relative to a reader, is determined. (Exemplary embodiments of techniques for determining tag locations are described below.) In a method act 430, the orientation of the data carrier relative to the reader is determined based on the detected locations of the tags. In a method act 440, a command is selected based on the determined data carrier orientation. In a method act 450, the selected command is sent to an appropriate component for execution (e.g., a "lock door" command is sent to a lock, a "send car to lobby" command is sent to an elevator system).

Various technologies can be used to determine the relative position of a data carrier to a reader. Disclosed herein are examples of possible technologies; in certain embodiments, one or more other technologies can also be used with one or more of the methods disclosed herein.

Figure 5:
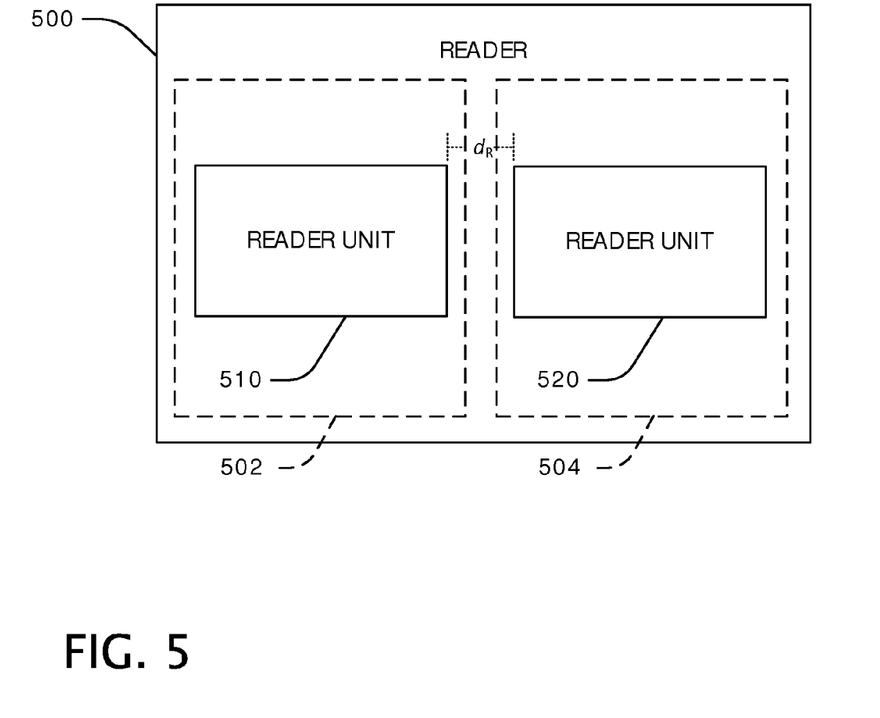
FIG. 5 shows a block diagram of an exemplary embodiment of a reader.

FIG. 5 shows a block diagram of an exemplary embodiment of a reader 500. The reader 500 comprises first and second reader units 510, 520. Each of the reader units 510, 520 comprises, for example, an RFID reader or an NFC reader, depending on the type of tags to be read. The first reader unit 510 is configured (e.g., positioned) to detect one or more tags that are near a first region 502 of the reader 500. The second reader unit 520 is configured (e.g., positioned) to detect one or more tags that are near a second region 504 of the reader 500. In some cases, the first and second reader units 510, 520 detect tags using a common radio frequency. In such cases, a data carrier having two radio frequency tags (e.g., similar to the data carrier 130 of FIG. 1) can be used. A reader unit determines which tag (if any) is near the reader unit's corresponding region based on the relative strength of the signal that the reader unit receives from the tags. For example, if the reader unit 510 receives a stronger signal from a first tag and a weaker signal (or no signal) from a second tag, then the reader 500 can conclude that the first tag (but not the second tag) is near the first region 502 and is considered a command.

The reader units 510, 520 can be separated from each other by a distance $d_R$. The separation represented by the distance $d_R$ can aid in determining the respective locations of tags. For example, the distance $d_R$ can be selected such that a tag is not mistakenly detected as being closest to one reader unit, when actually it is closer to the other unit. The actual value for $d_R$ varies from embodiment to embodiment, but $d_R$ can depend on one or more factors, such as: size of the tags 140, 142; size of the data carrier 130; size of the reader units 510, 520; sensitivity of the reader units 510, 520; distances between the tags 140, 142 (e.g., the distance $d_T$); and/or other factors. Exemplary values for the distance $d_R$ can include: less than 1 cm, 1 cm, 2 cm, 3 cm, 4 cm, 5 cm, 10 cm or another distance.

In further embodiments, the reader units 510, 520 detect tags using different radio frequencies. Such embodiments can use a data carrier like the data carrier 600, shown in FIG. 6. The data carrier 600 comprises at least two tags 610, 612, which are RFID tags that operate at a first frequency. The data carrier 600 further comprises at least two tags 620, 622, which are RFID tags that operate at a second frequency. Preferably the tags are positioned at the edges of the card to maximize the distance between them. Returning to FIG. 5, if the reader unit 510 is configured to read tags at the first frequency and the reader unit 520 is configured to read tags at the second frequency, then each of the reader units 510, 520 can determine which portion of the data carrier 600 is positioned near the corresponding region 502, 504 of the reader 500.

Figure 6:
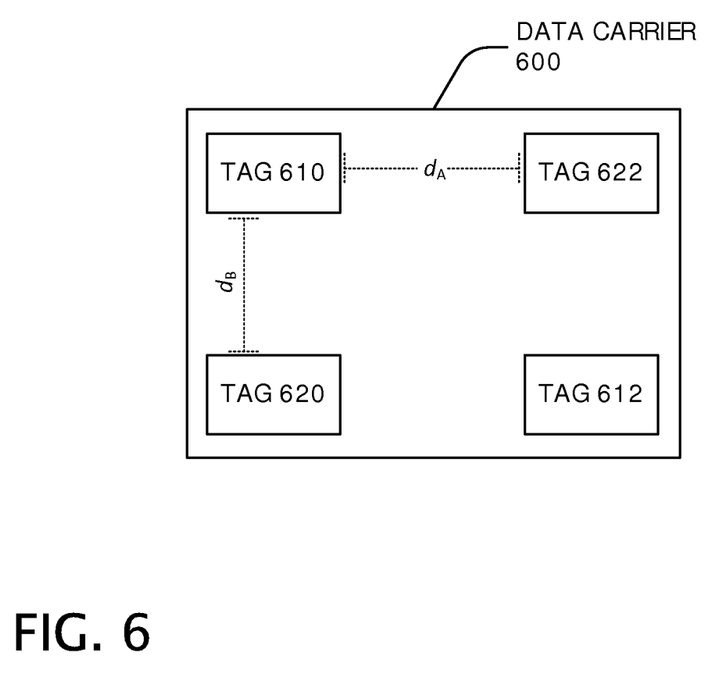
FIG. 6 shows a block diagram of an exemplary embodiment of a data carrier.

The tags 610, 612, 620, 622 are separated according to the distances $d_A$ and $d_B$, as shown in FIG. 6. The values for the distances $d_A$ and $d_B$ can vary according to the particular embodiment, similar to the distance $d_T$. Exemplary values for the distances $d_A$ and $d_B$ can include: less than 1 cm, 1 cm, 2 cm, 3 cm, 4 cm, 5 cm, or another distance.

In additional variations, a reader and a data carrier can be configured to operate using more than two different frequencies (e.g., three frequencies, four frequencies, five frequencies, or another number of frequencies).

Particular embodiments have a selected ratio of the size of the reader units 510, 520 to the size of the tags (e.g., the tags 140, 142, 610, 612, 620, 622). (For tags that receive and transmit radio signals, this ratio can be based on, for example, the area of the antenna used by the tags.) Exemplary ratios of reader-unit size to tag size can include: 1:1; 1:1.5; 1:2; 1:3; 2:1; 1.5:1; or another ratio.

Figure 7:
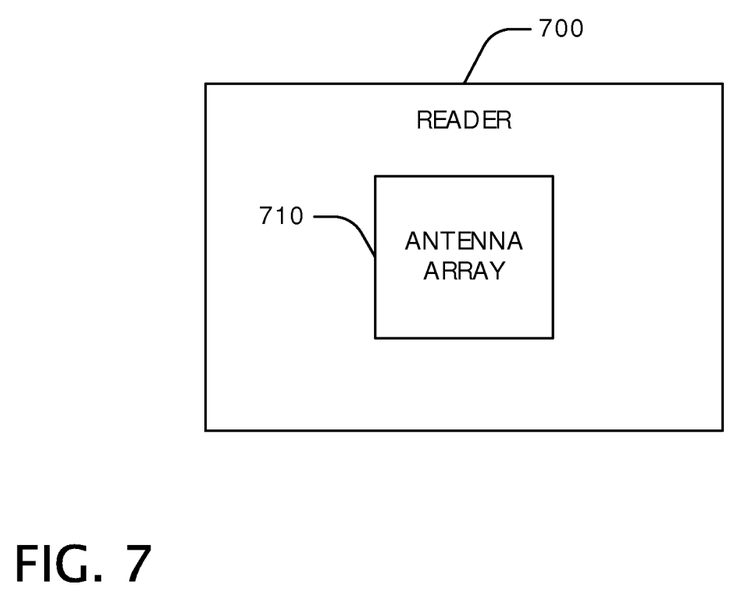
FIG. 7 shows a further exemplary embodiment of a reader.

FIG. 7 shows a further exemplary embodiment of a reader 700, which can be used to determine the locations of tags using radio frequencies. The reader 700 comprises an antenna array 710. The antenna array 710 can determine the location of a tag relative to the array based on signals received by different elements of the array.

In any of the disclosed embodiments, a reader can use one or more anti-collision techniques in determining the locations of multiple tags that operate at the same frequency.

In embodiments where the tags are optical codes, the reader comprises one or more optical code readers (e.g., a camera, a scanner, or another device).

Figure 8:
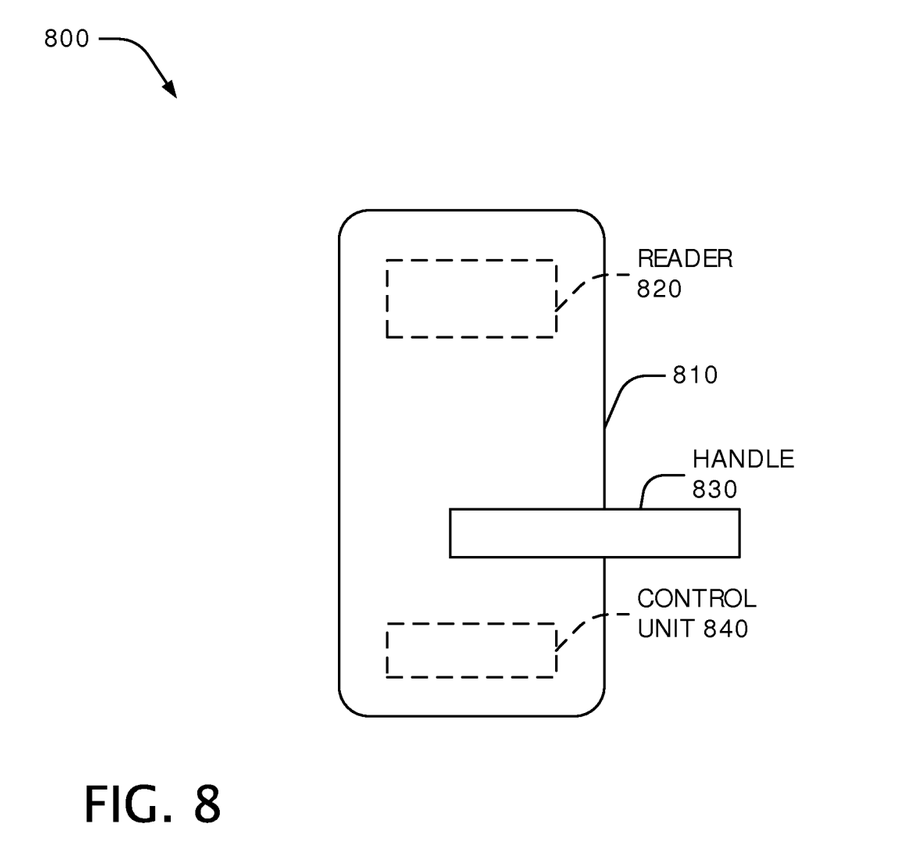
FIG. 8 shows an exemplary embodiment of an electronic door lock.

FIG. 8 shows an exemplary embodiment of an electronic door lock 800. The lock 800 comprises a housing 810, which contains at least one data-carrier reader 820. The location of the data-carrier reader 820 is marked on the housing 810. The reader 820 can be, for example, the reader 500 or 700, described above, or another data-carrier reader. The lock 800 further comprises a handle 830 and a computer-based control unit 840. The control unit 840 is programmed to perform one or more method acts disclosed herein, for example, embodiments of the methods 200, 400. In some embodiments, the control unit 840 is coupled to one or more building control systems (e.g., an elevator installation, an access control system, a lighting system, a heating system, a cooling system, a ventilation system, and/or another system that controls some aspect of a building's environment). Thus, through the lock 800, a user can send commands to the lock 800 and/or to a building control system.

Figure 9:
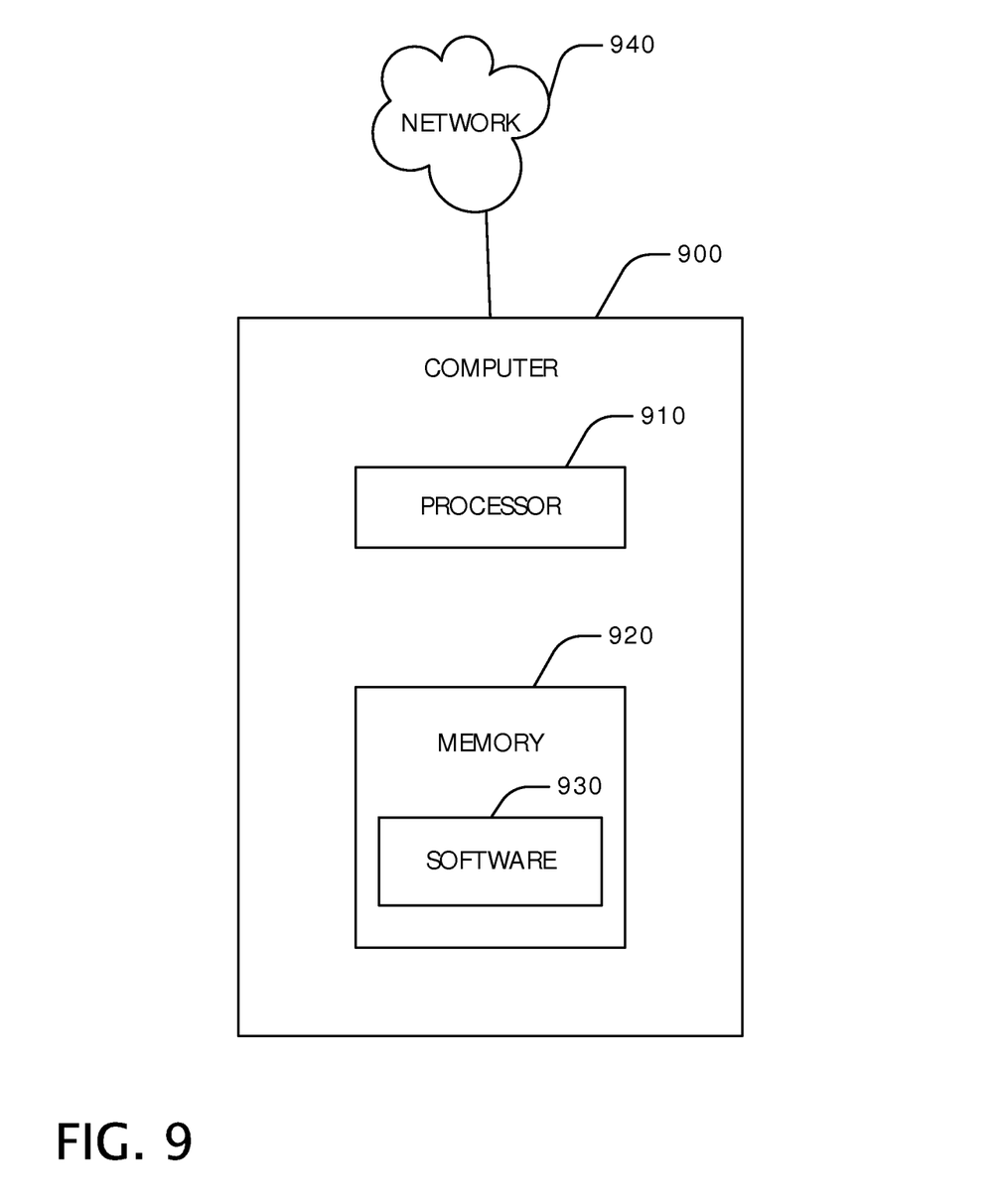
FIG. 9 shows a block diagram of an exemplary embodiment of a computer.

FIG. 9 shows a block diagram of an exemplary embodiment of a computer 900 (e.g., part of an elevator control system, part of a system control unit, part of an access control system, part of an electronic lock, part of a reader) that can be used with one or more technologies disclosed herein. The computer 900 comprises one or more processors 910. The processor 910 is coupled to a memory 920, which comprises one or more computer-readable storage media storing software instructions 930. When executed by the processor 910, the software instructions 930 cause the processor 910 to perform one or more method acts disclosed herein. Further embodiments of the computer 900 can comprise one or more additional components. The computer 900 can be connected to one or more other computers or electronic devices through an input/output component (not shown). In at least some embodiments, the computer 900 can connect to other computers or electronic devices through a network 940. In particular embodiments, the computer 900 works with one or more other computers, which are located locally and/or remotely. One or more of the disclosed methods can thus be performed using a distributed computing system.

In various embodiments, one or more method acts disclosed herein are performed by the system control unit 110. In further embodiments, one or more method acts are performed by one or more other computer-based components (e.g., a reader 120).

At least some embodiments of the disclosed technologies can allow for more flexible operation of systems such as access control systems, elevator systems, electronic locks, and other systems. For example, a user can, using a card or other data carrier, input different commands into a lock. This can be done without the user touching the surface of the lock or other interface with his or her hands. Accordingly, a command can be input without using any buttons. Thus, use of such embodiments can be more sanitary than other technologies because disease or dirt is not transferred between the lock or other interface and the user. Some embodiments can reduce or eliminate the need to have buttons or other elements on the interface surface. This can reduce maintenance of the interface, simplify construction of the interface (e.g., reduce the number of moving parts) and reduce opportunities for vandalism of the interface. Generally, a data carrier does not need to be inserted into a slot or a reader or even come into contact with the reader. Accordingly, a data carrier can be used to input a command while the carrier is in a case or other carrier (e.g., a wallet). Information associated with the input of commands (e.g., when the command was inputted, who inputted the command) can also be stored and analyzed.

In various embodiments, the disclosed systems and methods can be used as access control systems and access control methods, respectively. For example, they can be used to control access to one or more areas, including a room, a building, a building floor, a compartment, and/or an elevator installation.

In one non-limiting example, a user approaches a lock that is mounted on the door of the user's apartment. The user knows that a guest has just arrived in the lobby of the apartment building, and the user wishes to send an elevator car to retrieve the guest. The user holds a credit-card-shaped RFID card in front of a reader that is part of the lock. The reader determines the relative locations of two RFID tags in the card and uses this information to determine the orientation of the card relative to the lock. Specifically, the lock determines that the tag in the left-hand side of the card is over (e.g., in front of) a left-hand portion of the reader, and that the tag in the right-hand side of the card is over (e.g., in front of) a right-hand portion of the reader. Based on this information, the lock determines that the card is in a "right-side-up" position. The lock is programmed to recognize that this position corresponds to a command to send the elevator to the lobby to receive a passenger. Accordingly, the lock instructs the elevator installation to send a car to the lobby so that the guest can be brought to the user's floor. When the guest arrives at the door to the user's apartment, the user again holds the RFID card in front of the reader. This time, the card is rotated approximately 180 degrees relative to the previous position. The reader detects the new positions of the tags and determines that the card is now in an "upside-down" position. The lock recognizes that the corresponding command for this card position is to unlock the door, which the lock performs. The user can thus welcome the guest into the apartment.

Although some embodiments of the various methods disclosed herein are described as comprising a certain number of method acts, further embodiments of a given method can comprise more or fewer method acts than are explicitly disclosed herein. In additional embodiments, method acts are performed in an order other than as disclosed herein. In some cases, two or more method acts can be combined into one method act and/or one method act can be divided into two or more method acts.

As used herein, a "user" can be a person, a machine (e.g., a trolley, a bed, a wheelchair, or other device) and/or an animal.

In some embodiments, a system can also be programmed to read information from a data carrier that is used, for example, to identify a user.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention.

In particular embodiments a command input method comprises: determining, using a reader, a first location of a first tag in a data carrier relative to the reader; determining, using the reader, a first location of a second tag in the data carrier relative to the reader; determining a first orientation of the data carrier relative to the reader based on the first location of the first tag and the first location of the second tag; selecting a first command based on the first orientation of the data carrier; determining, using the reader, a second location of the first tag relative to the reader; determining, using the reader, a second location of the second tag relative to the reader; determining a second orientation of the data carrier relative to the reader based on the second location of the first tag and the second location of the second tag; and selecting a second command based on the second orientation of the data carrier.

In further embodiments, a command input system comprises: a reader; and a computer-based control device coupled to the reader, the control device being configured to perform a method, the method comprising determining, using the reader, a first location of a first tag in a data carrier relative to the reader, determining, using the reader, a first location of a second tag in the data carrier relative to the reader, determining a first orientation of the data carrier relative to the reader based on the first location of the first tag and the first location of the second tag, selecting a first command based on the first orientation of the data carrier, determining, using the reader, a second location of the first tag relative to the reader, determining, using the reader, a second location of the second tag relative to the reader, determining a second orientation of the data carrier relative to the reader based on the second location of the first tag and the second location of the second tag, and selecting a second command based on the second orientation of the data carrier.

In additional embodiments, or more computer-readable storage media have encoded thereon instructions that, when executed by a processor, cause the processor to perform a command input method, the method comprising: determining, using a reader, a first location of a first tag in a data carrier relative to the reader; determining, using the reader, a first location of a second tag in the data carrier relative to the reader; determining a first orientation of the data carrier relative to the reader based on the first location of the first tag and the first location of the second tag; selecting a first command based on the first orientation of the data carrier; determining, using the reader, a second location of the first tag relative to the reader; determining, using the reader, a second location of the second tag relative to the reader; determining a second orientation of the data carrier relative to the reader based on the second location of the first tag and the second location of the second tag; and selecting a second command based on the second orientation of the data carrier.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A command input method, comprising the steps of:
   determining, using a reader, a first location of a first tag in a data carrier relative to the reader;
   determining, using the reader, a first location of a second tag in the data carrier relative to the reader, the data carrier having a card form, a key fob form, or a sticker form;
   determining a first orientation of the data carrier relative to the reader based on the first location of the first tag and the first location of the second tag;
   selecting a first command based on the first orientation of the data carrier;
   determining, using the reader, a second location of the first tag relative to the reader;
   determining, using the reader, a second location of the second tag relative to the reader;
   determining a second orientation of the data carrier relative to the reader based on the second location of the first tag and the second location of the second tag;
   selecting a second command based on the second orientation of the data carrier; and
   sending at least one of the first and second commands to a control system or a lock to carry out the sent command.

2. The command input method according to claim 1 wherein the data carrier includes one or more markings associated with the first command or the second command.

3. The command input method according to claim 1 wherein the data carrier has first and second surfaces, the first surface of the data carrier facing the reader during the determining of the first and second locations of the first tag and the first and second locations of the second tag.

4. The command input method according to claim 1 where the reader includes first and second reader units, performing the determining the first location of the first tag by reading the first tag using the first reader unit, and performing the determining the first location of the second tag by reading the second tag using the second reader unit.

5. The command input method according to claim 1 including sending the selected command to a building control system.

6. The command input method according to claim 5 wherein the building control system includes one or more of an elevator control system, an access control system, a lighting system, a heating system, a cooling system, and a ventilation system.

7. The command input method according to claim 1 wherein the data carrier touches the reader during performance of the determining steps.

8. The command input method according to claim 1 wherein the data carrier does not touch the reader during performance of the determining steps.

9. The command input method according to claim 1 wherein the data carrier is not inserted into the reader during performance of the determining steps.

10. A command input system comprising:
    a reader; and
    a computer-based control device coupled to the reader, the control device being configured to perform a method comprising the steps of,
       determining, using the reader, a first location of a first tag in a data carrier relative to the reader, the data carrier having a card form, a key fob form, or a sticker form,
       determining, using the reader, a first location of a second tag in the data carrier relative to the reader,
       determining a first orientation of the data carrier relative to the reader based on the first location of the first tag and the first location of the second tag,
       selecting a first command based on the first orientation of the data carrier,
       determining, using the reader, a second location of the first tag relative to the reader,
       determining, using the reader, a second location of the second tag relative to the reader,
       determining a second orientation of the data carrier relative to the reader based on the second location of the first tag and the second location of the second tag,
       selecting a second command based on the second orientation of the data carrier, and sending at least one of the first command and the second command to a control system or a lock to carry out the sent command.

11. The command input system according to claim 10 including a lock, the method further including sending the at least one of selected commands to the lock.

12. The command input system according to claim 10 wherein the reader includes an antenna array.

13. The command input system according to claim 10 wherein the reader includes first and second reader units.

14. The command input system according to claim 10 wherein the data carrier includes third and fourth tags.

15. The command input system according to claim 10 wherein the command input system is mounted in a housing for a lock.

16. A non-transitory computer-readable storage media having encoded thereon instructions that, when executed by a processor, cause the processor to perform a command input method comprising the steps of:

determining, using a reader, a first location of a first tag in a data carrier relative to the reader;

determining, using the reader, a first location of a second tag in the data carrier relative to the reader, the data carrier having a card form, a key fob form, or a sticker form;

determining a first orientation of the data carrier relative to the reader based on the first location of the first tag and the first location of the second tag;

selecting a first command based on the first orientation of the data carrier;

determining, using the reader, a second location of the first tag relative to the reader;

determining, using the reader, a second location of the second tag relative to the reader;

determining a second orientation of the data carrier relative to the reader based on the second location of the first tag and the second location of the second tag;

selecting a second command based on the second orientation of the data carrier; and  sending at least one of the first command and the second command to a control system or a lock to carry out the sent command.

* * * * *